United States Patent
Aslan et al.

(10) Patent No.: US 7,449,943 B1
(45) Date of Patent: Nov. 11, 2008

(54) MATCHING FOR TIME MULTIPLEXED RESISTORS

(75) Inventors: Mehmet Aslan, Sunnyvale, CA (US); Dan D'Aquino, San Diego, CA (US)

(73) Assignee: National Semiconductor Corporation, Santa Clara, CA (US)

(*) Notice: Subject to any disclaimer, the term of this patent is extended or adjusted under 35 U.S.C. 154(b) by 191 days.

(21) Appl. No.: 11/315,527

(22) Filed: Dec. 21, 2005

Related U.S. Application Data

(60) Provisional application No. 60/719,813, filed on Sep. 23, 2005.

(51) Int. Cl.
    *H01L 25/00* (2006.01)
(52) U.S. Cl. ...................................... 327/566; 374/178

(58) Field of Classification Search ......... 323/311–315, 323/907, 226, 210, 272; 307/230, 229, 492, 307/107–109; 327/350–352, 512, 539, 566, 327/538; 374/178, 183
See application file for complete search history.

(56) References Cited

U.S. PATENT DOCUMENTS

| | | | | |
|---|---|---|---|---|
| 4,071,813 A | * | 1/1978 | Dobkin | 323/226 |
| RE30,586 E | * | 4/1981 | Brokaw | 323/314 |
| 5,196,740 A | * | 3/1993 | Austin | 327/566 |

* cited by examiner

*Primary Examiner*—Rajnikant B Patel

(57) ABSTRACT

An embodiment of the present invention is directed to a method of matching time-multiplexed resistors to a known ratio including generating a control signal from a control circuit, which includes a value that defines a configuration. The method also includes receiving the control signal at a switching circuit, detecting whether the value of the control signal has changed, and, provided the value has changed, switching a plurality of resistors from a first configuration to a second configuration. The first configuration produces a first resistance, and the second configuration produces a second resistance. The ratio of the first resistance and the second resistance are the aforementioned known ratio.

21 Claims, 5 Drawing Sheets

210

220

MATCHING FOR TIME MULTIPLEXED RESISTORS

CROSS REFERENCES TO RELATED APPLICATIONS

This application claims priority to provisional patent application Ser. No. 60/719,813, entitled "Improved Matching for Time Multiplexed Resistors," with filing date Sep. 23, 2005, and assigned to the assignee of the present invention, the disclosure of which is hereby incorporated by reference. This application is related to co-pending patent application, Ser. No. 11/315,511, entitled "Improved Matching For Time Multiplexed Transistors," with filing date Dec. 21, 2005, and assigned to the assignee of the present invention, the disclosure of which is hereby incorporated by reference. This application is also related to co-pending patent application, Ser. No. 11/314,066, entitled "Systems and Methods for Adjusting Parameters of a Temperature Sensor for Settling Time Reduction," with filing date Dec. 20, 2005, and assigned to the assignee of the present invention, the disclosure of which is hereby incorporated by reference.

BACKGROUND OF THE INVENTION

Various electronic applications exist that involve sending varying currents through a circuit and then reading and recording the output voltage that corresponds to each current. In many cases, this output voltage is the base-emitter voltage, a p-n junction, of a bipolar junction transistor (BJT). One such circuit is an electronic temperature sensor circuit that is configured to measure the temperature on a remote (separate) silicon chip by providing two target collector currents ($I_{C1}$, $I_{C2}$) to a p-n junction located on the remote chip. This circuit measures two diode voltages ($V_{BE1}$, $V_{BE2}$) of this p-n junction and processes the diode voltages to determine the actual temperature at the remote location. Most p-n junctions employed for this purpose are parasitic vertical p-n-p silicon based transistors. Also, the temperature sensor circuit is usually arranged to control the emitter currents of the transistor.

The classic diode equation determines a change in the base emitter voltage ($\Delta V_{BE}$) for a p-n-p transistor as follows:

$$\Delta Vbe = \eta \frac{\kappa T}{q} \ln\left(\frac{I_{C1}}{I_{C2}}\right) \tag{1}$$

where $\eta$ is a non-ideality constant substantially equivalent to 1.00 or slightly more/less, $\kappa$ is the well known Boltzmann's constant, q is the electron charge, T is the temperature in Kelvin, $I_{C1}$ is a first collector current, and $I_{C2}$ is a second collector current that are present at the measurement of a first base-emitter voltage and a second base-emitter voltage.

The classic diode equation is often employed to determine the actual temperature at a remotely located p-n-p transistor based on a ratio of approximated collector currents. In the past, since a ratio of collector currents tended to be relatively equivalent to a ratio of known emitter currents ($I_E$), the diode equation could be accurately approximated in a rewritten form that follows:

$$T = \frac{\Delta V_{BE}}{\eta \frac{\kappa}{q} \ln\left(\frac{I_{E1}}{I_{E2}}\right)}; \text{ where } \frac{I_{C1}}{I_{C2}} = \frac{I_{E1}}{I_{E2}} \tag{2}$$

However, due in part to process variations for integrated circuits with smaller process geometries, the assumption regarding relatively equivalent ratios may no longer be valid. The beta (ratio of collector current over base current) has been shown to vary as much as ten percent or more between two known emitter currents for p-n-p transistors in integrated circuits manufactured from relatively smaller process geometries. Thus, the diode equation approximation (Equation 2) regarding the ratios of collector and emitter currents for a transistor can cause relatively inaccurate temperature measurements in an integrated circuit based on smaller process geometries. Relatively significant inaccurate temperature measurements can occur in integrated circuits that have process geometries of 90 nanometers or less. It should be appreciated that these measurements represent examples of problems experienced, and different manufacturers may start showing these effects at different process geometries.

Subsequent art provided for a more accurate temperature measurement for a transistor with a rewritten form of the diode equation (Equation 3) that provides for actually measuring or controlling the ratio of collector currents instead of the ratio of emitter currents.

$$T = \frac{\Delta V_{BE}}{\eta \frac{\kappa}{q} \ln\left(\frac{I_{C1}}{I_{C2}}\right)} \tag{3}$$

The disadvantage of this method, however, was that it required measuring $I_C$ and converting it to a digital form in real-time, which, when done accurately, is extremely expensive.

Yet another alternative has been to drive the collector currents to a predetermined ratio, thus eliminating the need to measure the collector currents independently. Consequently, Equation 3 can be rewritten as:

$$T = \frac{\Delta V_{BE}}{\eta \frac{\kappa}{q} \ln N} \tag{4}$$

However, many temperature-sensing circuits use op-amps, which introduce offset voltages that adversely affect the target current ratio by causing error currents. Taking the offset into account, the current ratio can be expressed as:

$$\frac{I_{CN}}{I_{C1}} = \frac{I_{CTN} + \frac{V_{OS}}{R}}{I_{CT1} + \frac{V_{OS}}{R}} \tag{5}$$

Where $I_{CT1}$ and $I_{CTN}$ are the actual currents injected into the circuit such that $I_{CTN}$ is N times the current $I_{CT1}$, and R is the value of a the resistance seen by an input of the op-amp.

One solution to this problem is to multiplex between a high-current resistor ($R_N$) and a low-current resistor ($R_1$), where the value of the low-current resistor is N times the value of the high-current resistor. Thus, the equation for the current ratio becomes:

$$\frac{I_{CN}}{I_{C1}} = \frac{I_{CTN} + \frac{V_{OS}}{R_N}}{I_{CT1} + \frac{V_{OS}}{R_1}} = N \qquad (6)$$

Due to non-idealities in the resistance of two statistically independent resistors, however, an error factor still appears in the observed ration. In other words, the actual resistances of the resistors may be mismatched.

SUMMARY OF THE INVENTION

An embodiment of the present invention is directed to a method of matching time-multiplexed resistors to a known ration including generating a control signal from a control circuit, which includes a value that defines a configuration. The method also includes receiving the control signal at a switching circuit, detecting whether the value of the control signal has changed, and, provided the value has changed, switching a plurality of resistors from a first configuration to a second configuration. The first configuration produces a first resistance, and the second configuration produces a second resistance. The ratio of the first resistance and the second resistance are the aforementioned kwon ratio.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 1:
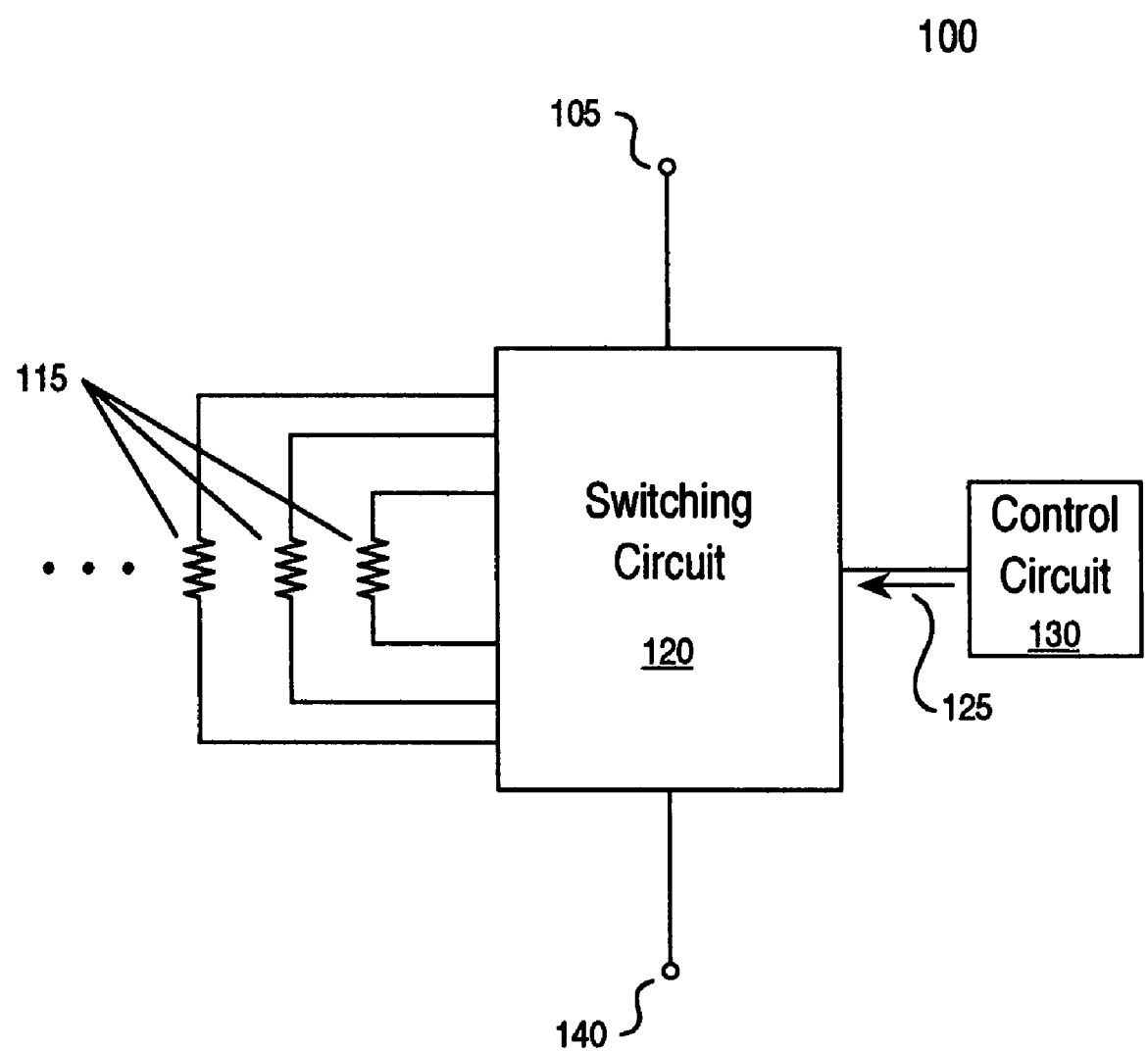
FIG. 1 shows a block diagram of an apparatus, in accordance with an embodiment of the present invention.

Briefly stated, an embodiment is directed to an apparatus and method for improved matching for time-multiplexed resistors. FIG. 1 shows a block diagram of an embodiment. The apparatus 100 in FIG. 1 comprises a plurality of resistors 115. In one embodiment, the resistors all have the same value (e.g. all 100Ω resistors). In another embodiment, the resistors have varying values. However, for reasons that become apparent below, resistors having the same resistance are preferred.

Figure 2:
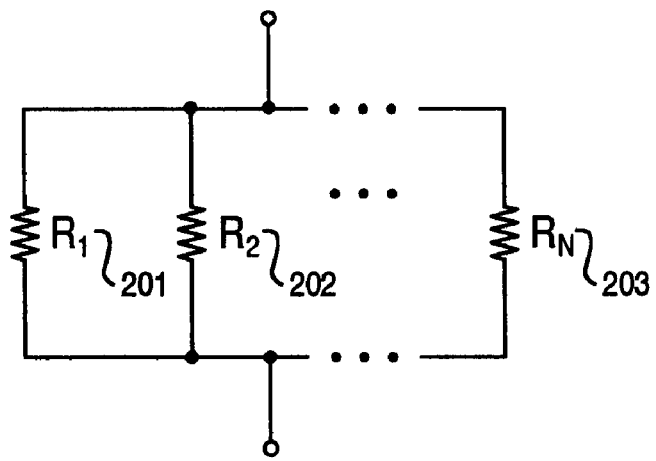
FIG. 2 illustrates the different configurations achieved by a matched resistor array, in accordance with an embodiment of the present invention.
Figure 2:
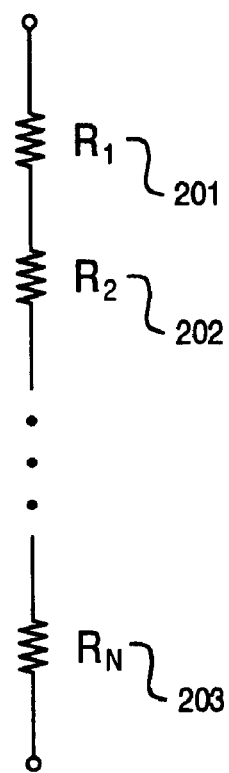

A switching circuit 120 is coupled to the resistors. The switching 120 circuit switches the resistors 115 from a first configuration to a second configuration. In an exemplary embodiment, the switching circuit switches the resistors between series and parallel configurations. FIG. 2 illustrates parallel 210 and series 220 configurations of a plurality of resistors 115 comprising N number of resistors 201-203. In a preferred embodiment, the resistors 201-203 are matched as best as possible. In parallel configuration 210, resistors 201-203 have their first ends coupled together and their second ends coupled together by transistors (not shown). In series configuration 220, the resistors are reconnected to form a series chain. Thus, $R_1$ 201 is coupled in series with $R_2$ 202, $R_2$ 202 is coupled in series with $R_3$ (not shown), and so on, terminating with $R_{N-1}$ (not shown) coupled in series with $R_N$ 203.

The switching circuit 120 has a first node 105 and a second node 140. The first configuration of the resistors 115 produces a first resistance between the first node 105 and the second node 140. The second configuration of the resistors 115 produces a second resistance between the first node 105 and the second node 140.

The switching circuit 120 is also coupled to a control circuit 130. The control circuit 130 generates a control signal 125, which is received by the switching circuit 120. In one embodiment, the control circuit 130 includes a processor. In another embodiment, the control circuit 130 includes a programmable integrated circuit. The control signal 125 comprises a value that defines a configuration of the resistors 115. In one embodiment, the control signal is simple 1-bit logic, thus changing the resistors 115 between two possible configurations. It is appreciated that the control signal could have more bits in order to accommodate more configurations.

Figure 3:
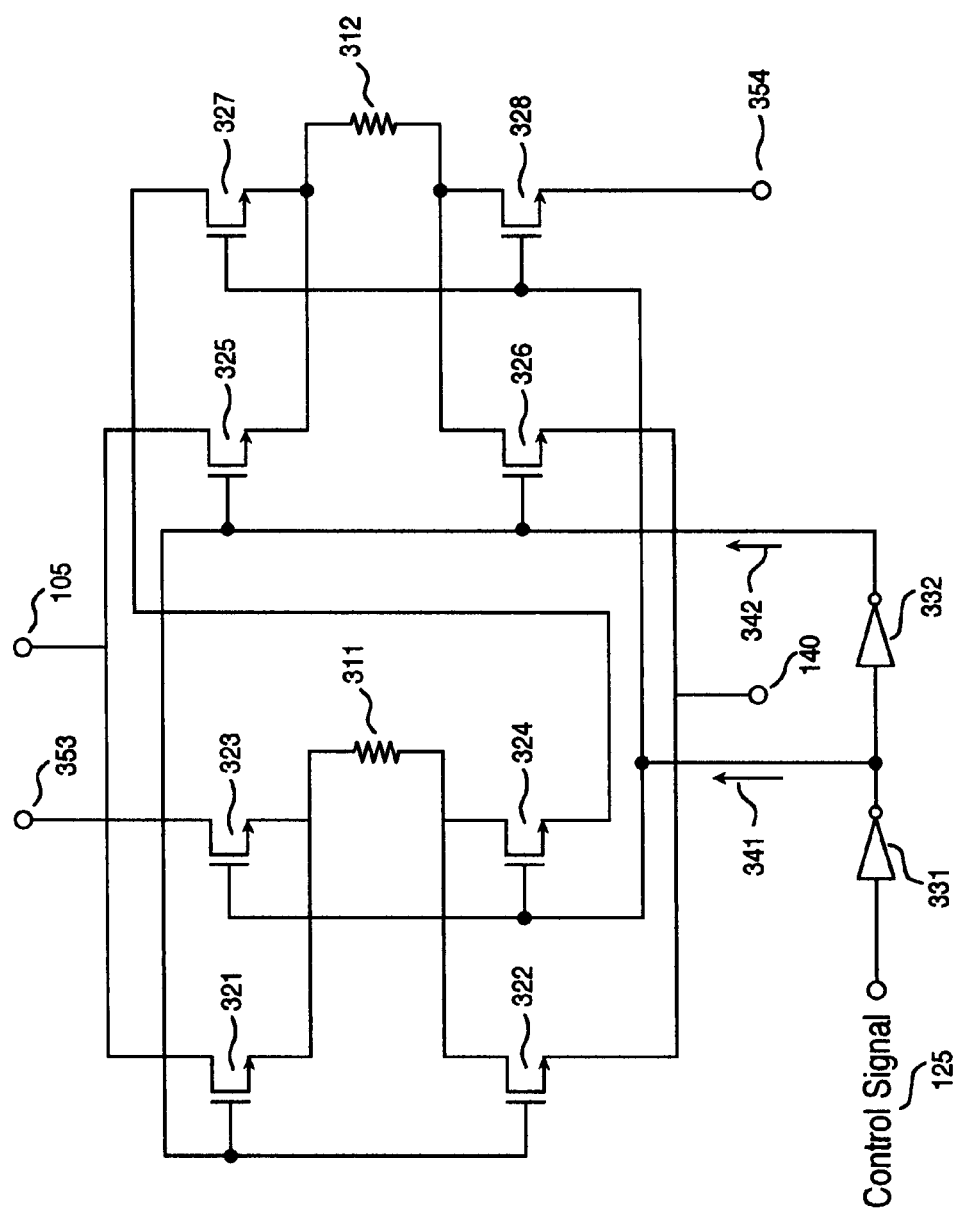
FIG. 3 shows an exemplary schematic diagram of a switching circuit of an embodiment of the present invention at the component level.

FIG. 3 illustrates an exemplary embodiment of a switching circuit 300 for switching at least two resistors from a first configuration to a second configuration. The circuit 300 receives the control signal 125 at the input of a first inverter 331, which generates a first switching signal 341. The output of the first inverter 331 is coupled to the input of a second inverter 332, which generates a second switching signal 342.

Each resistor 311 and 312 is coupled to four transistors, 321-324 and 325-328 respectively. Transistors are shown in FIG. 3 solely for exemplary purposes, and it should be appreciated that any other switching device may be substituted. The first transistor 321 is coupled to a first node 105 and a first end of the first resistor 311. The second transistor 322 is coupled to a second end of the first resistor and a second node 140. The third transistor 323 is coupled to a third node 353 and the first end of the first resistor 311. The fourth transistor 324 is coupled to the second end of the first resistor 311 and the seventh transistor 327. The fifth transistor 325 is coupled to the first node 105 and to a first end of the second resistor 312. The sixth transistor 326 is coupled to a second end of the second resistor 312 and the second node 140. The seventh transistor 327 is coupled to the fourth transistor 324 and the first end of the second resistor 312. The eighth transistor 328 is coupled to the second end of the second resistor 312 and a fourth node 354. The first node 105 serves as an attachment point for a first circuit. The second node 140 serves as an attachment point for a second circuit. The third node 353 either attaches to the first node 105 or to an additional transistor (not shown), similar to the manner in which transistors 324 and 327 are coupled, for the purpose of coupling an additional resistor (not shown) to the array. The fourth node 354 either attaches to the second node 140 or to an additional transistor (not shown), similar to the manner in which transistors 324 and 327 are coupled, for the purpose of coupling an additional resistor (not shown) to the array.

The first switching signal 341 controls transistors 323-324 and 327-328. The second switching signal 342, which is the inverse of the first switching signal 341, controls transistors 321-322 and 325-326. Thus at any given moment, either transistors 323-324 and 327-328 are on and transistors 321-322 and 325-326 are off or vise versa. When the first switching signal is active, transistors 323-324 and 327-328 are on and the resistors will effectively be in series configuration. When the second switching signal is active, transistors 321-322 and 325-326 are on and the resistors will effectively be in parallel configuration. Thus, the series and parallel configurations will produce a large and a small resistance respectively, the resistances having a predicable ratio to each other based on the number of resistors in the array.

In determining the desired resistance ratio, for reasons that will become apparent below it is preferred to select a ratio that is a square number. If the ratio is a square number, N, the number of resistors needed in the array is $\sqrt{N}$. For example, if four resistors are used, and the first configuration and the second configuration and series and parallel respectively, the ratio of the first resistance to the second resistance would be 16:1.

Determining the resistor configuration to achieve a non-square ratio is slightly more complicated. To do so requires factoring the desired ratio into two factors. These factors will then represent the number of resistors that must be used in the series and parallel configurations. For example, if the desired ratio is 20:1, the configuration options would be either 5×4 or 10×2. The 5×4 configuration would be preferred since 5 and 4 are the closest factors to a square. Thus, to achieve a 20:1 ratio would require placing five resistors in series and four in parallel or, alternatively, four in series and five in parallel.

Re-configuring multiple resistors in this manner, rather than simply using one large resistor and one small resistor, significantly improves the resistor matching. By using the exact same resistors to generate the large resistance that are used to generate the smaller resistance, the circuit will account for the variations in the actual resistances of the resistors. Even though the variations of the resistors will cause an error factor to appear in the overall resistance, the ratio of the errors will also be approximately N:1. Thus, the desired ratio is still preserved.

It is appreciated that in a situation such as this where a non-square ratio is desired, the effects of the variation in one or more of the resistors does not appear in both the large and the small resistors. Hence, using an equal number of resistors in both series and parallel configurations to achieve a square ratio is preferred.

Figure 4:
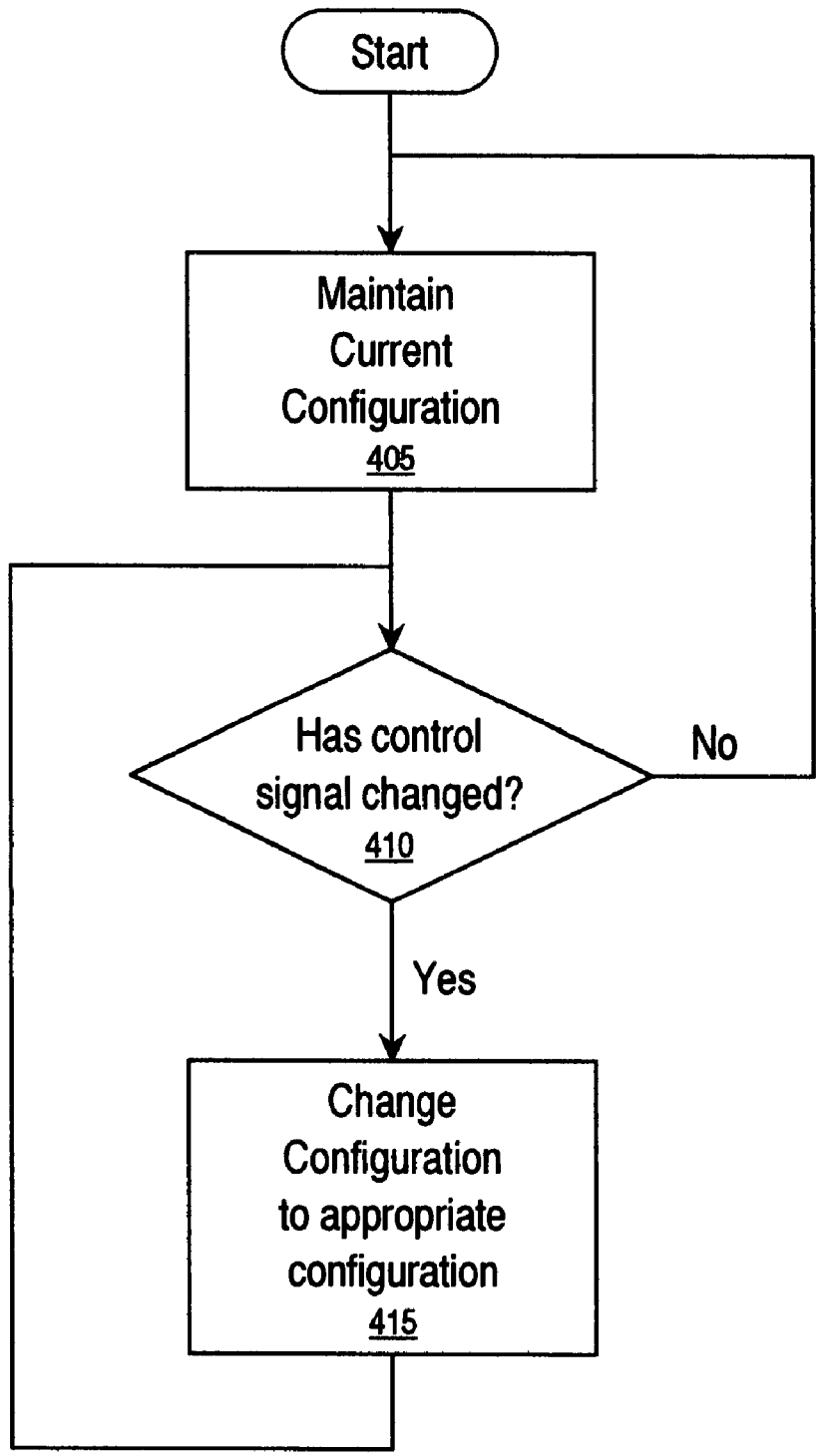
FIG. 4 shows a flowchart of a method of matching resistors, in accordance with an embodiment of the present invention.

FIG. 4 illustrates a flowchart of the process 400 by which an embodiment matches resistors to a known ratio. As described above, the control circuit 130 generates a control signal 125, which is received by the switching circuit 120. The switching circuit 120 maintains the current configuration 405 of the resistors 115 while monitoring the control signal for a change. If the switching circuit 120 detects a change 410, it changes the configuration of the resistors 415 from the first configuration to a second configuration corresponding to the new control signal.

An exemplary embodiment could be used to accurately measure the temperature of a remotely located transistor based at least in part on a ratio of two target collector currents ($I_{C1}$, $I_{C2}$) and two measurements of the base-emitter voltage ($V_{BE1}$, $V_{BE2}$) of the transistor.

Figure 5:
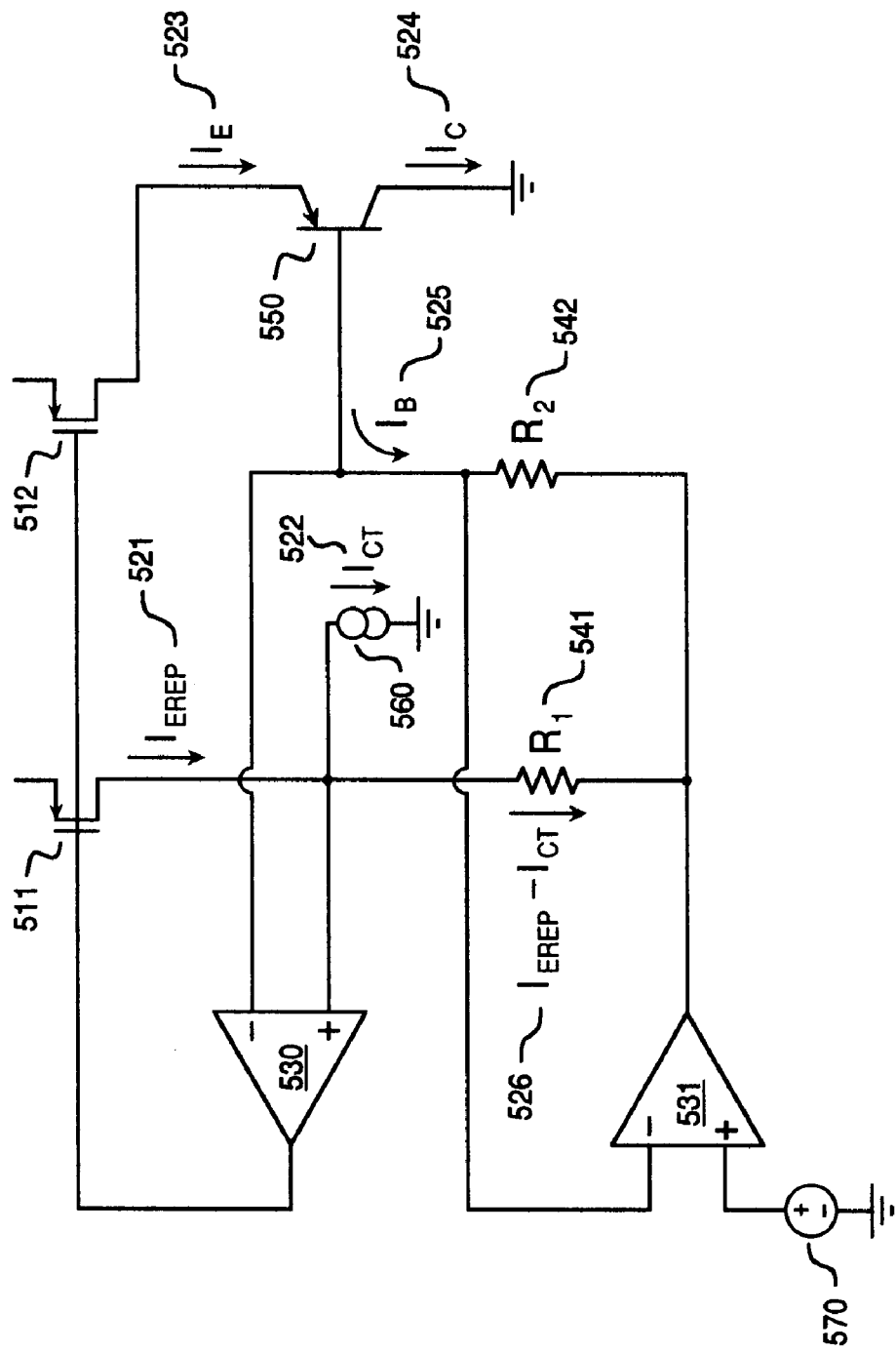
FIG. 5 shows a schematic diagram of an embodiment of the present invention at a general level in which the application is temperature sensing.

FIG. 5 shows an exemplary schematic diagram of a general overview of an embodiment as used in a temperature sensing circuit, where resistors 541 and 542 are not single resistors, but rather exemplary resistor arrays as shown in FIG. 2 comprising four resistors each. Transistors 511 and 512 each represent one high-current transistor and one low-current transistor that are multiplexed, where the ratio of the high current to the low current is 16:1. In an exemplary embodiment, the resistor arrays switch two sets of four resistors between series and parallel configurations in order to achieve a larger resistance and a smaller resistance respectively, the ratio of which is 16:1. When the high-current transistor is being used, the resistors will be in parallel. When the low-current transistor is being used, the resistors will be in series. Transistor 512 drives an emitter current 523 into BJT 550. Transistor 511 acts as a current mirror and generates a replica current 521 of the emitter current 523. Thus:

$$I_{EREP} = I_E \quad (7)$$

Voltage source 570 sets an offset voltage, which is maintained over $R_2$ 542 by op-amp 531. It should be appreciated that adding an offset voltage, while not necessary, improves the accuracy of the circuit. Op-amp 530 drives transistors 511 and 512 in order to equalize the voltage across resistors 541 and 542. Thus, the currents through resistors 541 and 542 are equal. The current through resistor 542 is the base current ($I_B$) of the BJT 550. The current through resistor 541 can be expressed as $I_{EREP} - I_{CT}$, where $I_{CT}$ is a target collector current generated by programmable current source 560. Thus:

$$I_{EREP} - I_{CT} = I_B \quad (8)$$

Substituting for $I_B$:

$$I_{EREP} - I_{CT} = I_E - I_C \quad (9)$$

Substituting Equation 7:

$$I_{CT} = I_C \quad (10)$$

Any error currents can lead to deviations from the desired current ratio. Error currents caused by the offset voltage of op-amp 530 are compensated for by switching resistors 541 and 542 between large and small resistances having a ratio of 16:1. By switching the resistors as described, any error currents that may appear are driven to a 16:1 ratio as well. Furthermore, any non-idealities in the resistors themselves are also accounted for by making the larger resistance statistically dependent on the smaller resistance (or vise versa).

Thus, the above embodiments are able to generate two or more resistances in a known ratio. As discussed, the embodiments generate the ratio with a high degree of accuracy because the circuit has accounted for the variations in the resistors.

What is claimed is:

1. A method of matching time-multiplexed resistors to a known ratio comprising:

generating a control signal from a control circuit, wherein said control signal comprises a value that defines a configuration;

receiving said control signal at a switching circuit;

detecting whether said value of said control signal has changed; and provided said value has changed, switching from a first configuration of a plurality of resistors to a second configuration of said plurality of resistors, wherein said first configuration produces a first resistance, wherein said second configuration produces a second resistance, wherein the ratio of said first resistance and said second resistance is said known ratio, and wherein said plurality of resistors are a same set of resistors used for both the first configuration and the second configuration.

2. The method as recited in claim 1 wherein the ratio of any error attributable to said first configuration to any error attributable to said second configuration is said known ratio.

3. The method as recited in claim 1 wherein said first configuration comprises coupling said resistors in parallel.

4. The method as recited in claim 3 wherein said second configuration comprises coupling said resistors in series.

5. The method as recited in claim 1 wherein said first configuration comprises coupling said resistors in series.

6. The method as recited in claim 5 wherein said first configuration comprises coupling said resistors in parallel.

7. The method as recited in claim 1 wherein said plurality of resistors comprises a first resistor and a second resistor, and wherein said switching comprises:

inverting said control signal to produce a first switching signal;

inverting said first switching signal to produce a second switching signal;

controlling a first switching device with said second switching signal, wherein said first switching device is coupled between a first node and a first terminal of said first resistor;

controlling a second switching device with said second switching signal, wherein said second switching device is coupled between a second terminal of said first resistor and a second node;

controlling a third switching device with said first switching signal, wherein said second switching device is coupled between a third node and said first terminal of said first resistor;

controlling a fourth switching device with said first switching signal, wherein said fourth switching device is coupled between said second terminal of said first resistor and a seventh switching device;

controlling a fifth switching device with said second switching signal, wherein said fifth switching device is coupled between said first node and a first terminal of said second resistor;

controlling a sixth switching device with said second switching signal, wherein said sixth switching device is coupled between a second terminal of said second resistor and said second node;

controlling said seventh switching device with said first switching signal, wherein said seventh switching device is coupled between said fourth switching device and said first terminal of said second resistor; and controlling an eighth switching device with said first switching signal, wherein said eighth switching device is coupled between said second terminal of said second resistor and a fourth node.

8. The method as recited in claim 1 wherein said pre-determined ratio is a square-number.

9. The method as recited in claim 1 wherein said method is used in a temperature sensor.

10. The method as recited in claim 1 wherein said plurality of resistor comprises at least four resistors.

11. An apparatus comprising:

a plurality of resistors;

a switching circuit coupled to said resistors, said switching circuit for switching from a first configuration of said resistors to a second configuration of said resistors, wherein said first configuration produces a first resistance and said second configuration produces a second resistance; and a control circuit coupled to said switching circuit, wherein said control circuit sends a control signal to said switching circuit which switches said resistors from said first configuration to said second configuration to establish a pre-determined ratio of said first resistance to said second resistance, wherein said resistors are a same set of resistors used for both the first configuration and the second configuration.

12. The apparatus as recited in claim 11 wherein said first configuration produces a first error resistance, wherein said second configuration produces a second error resistance, and wherein the ratio of said first error resistance and said second error resistance is said known ratio.

13. The apparatus as recited in claim 11 wherein said first configuration comprises coupling said resistors in parallel.

14. The apparatus as recited in claim 13 wherein said second configuration comprises coupling said resistors in series.

15. The apparatus as recited in claim 11 wherein said first configuration comprises coupling said resistors in series.

16. The apparatus as recited in claim 15 wherein said first configuration comprises coupling said resistors in parallel.

17. The apparatus as recited in claim 11 wherein said plurality of resistors comprises a first resistor and a second resistor, and wherein said switching circuit comprises:

a first inverter having an input coupled to said control signal;

a second inverter coupled to said first inverter;

a first switching device coupled between a first node and a first terminal of said first resistor, wherein said first switching device is controlled by an output of said second inverter;

a second switching device coupled between a second terminal of said first resistor and a second node, wherein said second switching device is controlled by said output of said second inverter;

a third switching device coupled between a third node and said first terminal of said first resistor, wherein said third switching device is controlled by an output of said first inverter;

a fourth switching device coupled between said second terminal of said first resistor and a seventh switching device, wherein said fourth switching device is controlled by said output of said first inverter;

a fifth switching device coupled between said first node and a first terminal of said second resistor, wherein said fifth switching device is controlled by said output of said second inverter;

a sixth switching device coupled between a second terminal of said second resistor and said second node, wherein said sixth switching device is controlled by said output of said second inverter;

a seventh switching device coupled between said fourth switching device and said first terminal of said second resistor, wherein said seventh switching device is controlled by said output of said first inverter; and an eighth switching device coupled to said second terminal of said second resistor and a fourth node, wherein said eighth switching device is controlled by said output of said first inverter.

18. The apparatus as recited in claim 11 wherein said pre-determined ratio is a square-number of resistors.

19. The apparatus as recited in claim 11 wherein said apparatus is used in a temperature sensor.

20. The apparatus as recited in claim 11 wherein said plurality of resistors comprises at least four resistors.

21. An apparatus for measuring the temperature of a transistor comprising:

a circuit for changing a collector current of said transistor between a first collector current and a second collector current, wherein the ratio of said first collector current to said second collector current is a pre-determined ratio;

a circuit for canceling op-amp offsets comprising:

a plurality of resistors;

a switching circuit coupled to said resistors, said switching circuit for switching from a first configuration of said resistors to a second configuration of said resistors, wherein said first configuration produces a first resistance and said second configuration produces a second resistance, and wherein said resistors are a same set of resistors used for both the first configuration and the second configuration; and a control circuit coupled to said switching circuit, wherein said control circuit sends a control signal to said switching circuit which switches said resistors from said first configuration to said second configuration to establish said pre-determined ratio of said first resistance to said second resistance; and a circuit for measuring a first base-emitter voltage of said transistor corresponding to said first collector current of said transistor and measuring a second base-emitter voltage of said transistor corresponding to said second collector current.

* * * * *